(12) United States Patent
Dhau et al.

(10) Patent No.: US 10,501,668 B2
(45) Date of Patent: Dec. 10, 2019

(54) ENCAPSULATION OF THERMAL ENERGY STORAGE MEDIA

(71) Applicants: Jaspreet Dhau, Tampa, FL (US); D. Yogi Goswami, Tampa, FL (US); Chand K. Jotshi, Gainesville, FL (US); Elias K. Stefanakos, Tampa, FL (US)

(72) Inventors: Jaspreet Dhau, Tampa, FL (US); D. Yogi Goswami, Tampa, FL (US); Chand K. Jotshi, Gainesville, FL (US); Elias K. Stefanakos, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 15/683,146

(22) Filed: Aug. 22, 2017

(65) Prior Publication Data

US 2018/0016482 A1    Jan. 18, 2018

Related U.S. Application Data

(62) Division of application No. 14/425,415, filed as application No. PCT/US2013/075971 on Dec. 18, 2013, now Pat. No. 9,765,251.

(60) Provisional application No. 61/738,655, filed on Dec. 18, 2012.

(51) Int. Cl.
| C09K 5/06 | (2006.01) |
| C09K 5/00 | (2006.01) |
| C23C 18/16 | (2006.01) |
| F28F 21/06 | (2006.01) |
| F28D 20/02 | (2006.01) |
| C23C 18/31 | (2006.01) |
| C25D 7/00 | (2006.01) |

(52) U.S. Cl.
CPC ............ *C09K 5/063* (2013.01); *C09K 5/00* (2013.01); *C23C 18/165* (2013.01); *C23C 18/1641* (2013.01); *C23C 18/31* (2013.01); *C25D 7/00* (2013.01); *F28D 20/023* (2013.01); *F28F 21/06* (2013.01); *F28F 2225/00* (2013.01); *F28F 2255/06* (2013.01); *Y02E 60/145* (2013.01)

(58) Field of Classification Search
CPC .. C09K 5/063; C08J 7/047; C08J 7/00; C23C 20/00; C23C 18/54; C23C 22/00; C23C 24/00; C23C 24/06
USPC .......................................... 252/75
See application file for complete search history.

(56) References Cited

U.S. PATENT DOCUMENTS

| 3,011,920 A * | 12/1961 | Shipley, Jr. | C23C 18/28 106/1.11 |
| 3,471,313 A * | 10/1969 | Emons, Jr. | C23C 18/24 427/304 |
| 3,672,923 A * | 6/1972 | Zeblisky | C23C 18/28 106/1.22 |

(Continued)

FOREIGN PATENT DOCUMENTS

| WO | 2006047240 | 5/2006 |
| WO | 2009115468 A1 | 9/2009 |

*Primary Examiner* — Jane L Stanley
(74) *Attorney, Agent, or Firm* — Thomas | Horstemeyer, LLP

(57) ABSTRACT

In one embodiment, a method for depositing metal on a polymer surface, the method includes coating the polymer surface with a binding metal to render the polymer surface solvophillic and/or hydrophilic and depositing a further metal on the binding metal-coated polymer surface.

12 Claims, 5 Drawing Sheets

(56) References Cited

U.S. PATENT DOCUMENTS

| | | | |
|---|---|---|---|
| 4,233,344 A * | 11/1980 | Brasch | C23C 18/28 427/304 |
| 4,281,034 A * | 7/1981 | Narayan | C08J 7/02 216/35 |
| 4,552,626 A * | 11/1985 | Stevenson | C23C 18/22 205/168 |
| 4,603,003 A | 7/1986 | Van Hook | |
| 4,708,812 A | 11/1987 | Hatfield | |
| 4,809,771 A | 3/1989 | Kennel | |
| 5,246,564 A * | 9/1993 | Tamiya | C23C 18/1651 205/169 |
| 6,770,369 B1 * | 8/2004 | Oyamada | B22F 1/025 427/212 |
| 7,316,262 B1 | 1/2008 | Rini et al. | |
| 7,919,184 B2 | 4/2011 | Mohapatra et al. | |
| 2002/0054964 A1 | 5/2002 | Hartmann | |
| 2007/0098976 A1 * | 5/2007 | Lee | C23C 18/1635 428/323 |
| 2009/0020264 A1 | 1/2009 | Morita et al. | |
| 2009/0301691 A1 | 12/2009 | Mohapatra | |
| 2011/0083826 A1 | 4/2011 | Matta et al. | |
| 2011/0259544 A1 | 10/2011 | Neti et al. | |
| 2012/0018116 A1 | 1/2012 | Mathur et al. | |
| 2012/0125573 A1 | 5/2012 | Rubenstein et al. | |
| 2012/0217165 A1 | 8/2012 | Feng | |

\* cited by examiner

ENCAPSULATION OF THERMAL ENERGY STORAGE MEDIA

CROSS-REFERENCE TO RELATED APPLICATION

This application is a divisional of co-pending U.S. application Ser. No. 14/425,415, filed Mar. 3, 2015, which claims priority to 35 U.S.C. § 371 national stage of PCT application PCT/US2013/075971, filed Dec. 18, 2013, which claims priority to and the benefit of U.S. Provisional Application No. 61/738,655, filed on Dec. 18, 2012, herein incorporated by reference in their entirety.

NOTICE OF GOVERNMENT-SPONSORED RESEARCH

This invention was made with Government support under grant contract number DE-EE0003490 awarded by the U.S. Department of Energy (DOE). The Government has certain rights in the invention.

BACKGROUND

Thermal energy storage is critical to the future of solar thermal power. Such storage reduces the cost of the energy and enables the energy to be available both during and after daylight hours. The selection of appropriate thermal energy storage media is important to developing an effective thermal energy storage scheme. Phase change materials (PCMs) are particularly attractive for such applications because they can store much more heat than sensible heat storage materials.

It would be desirable to use PCMs both in future installations as well as existing installations that are not specifically configured for use of such materials. In view of this, it would further be desirable to develop a way to encapsulate PCMs so that they can be used in both future and existing installations.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
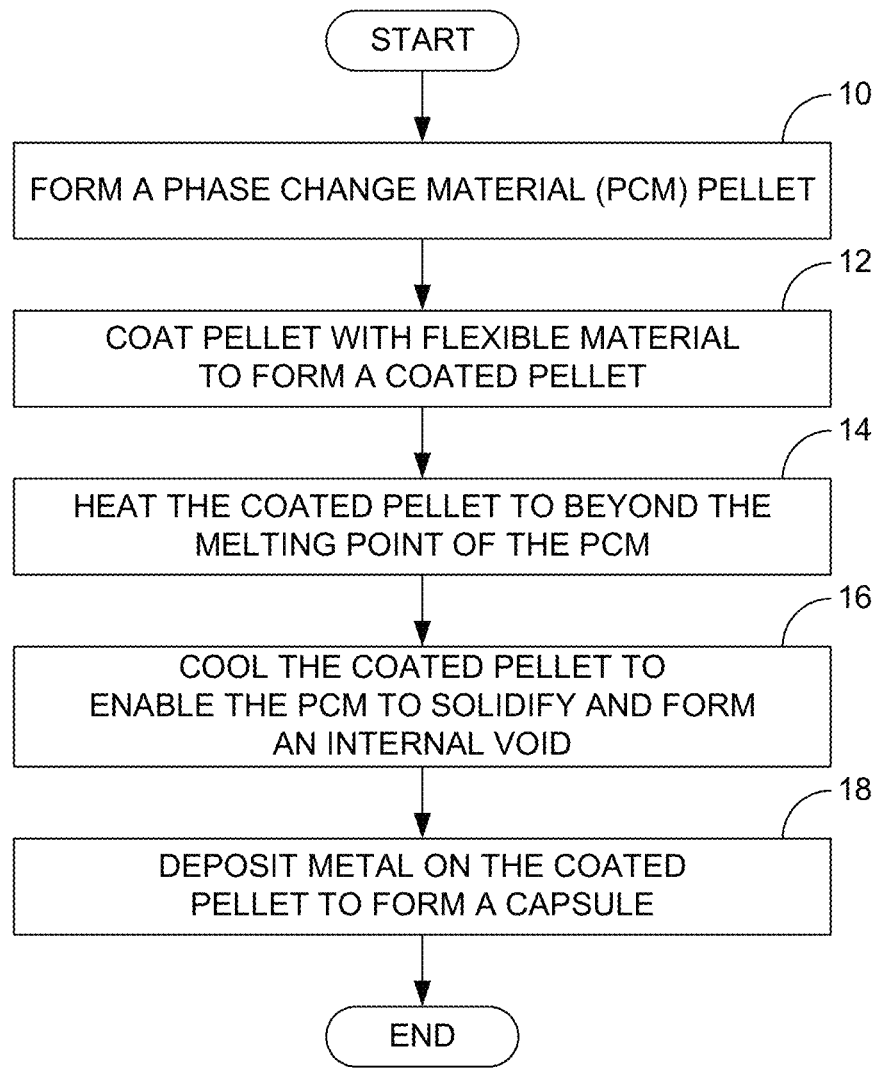
FIG. 1 is a flow diagram of an embodiment of a method for encapsulating thermal energy storage media, such as phase change material (PCM).

As described above, it would be desirable to have a way to encapsulate thermal energy storage media, such as phase change materials (PCMs). Disclosed herein are encapsulation techniques and capsules that are appropriate for this purpose. In some embodiments, a pellet of solid PCM is first coated with a layer of flexible material and the coated pellet is then heated. The PCM expands as it is heated as does the flexible material. During this heating, air contained within the pores of the solid pellet diffuses out through the pores of the flexible material. Once the temperature rises above the melting temperature of the PCM, the PCM melts and, eventually, no solid PCM remains. The coated pellet is then enabled to cool. As the molten PCM cools it solidifies from the outside—in so that the pellet maintains much of its increased size. As the molten PCM solidifies, it shrinks and air that was dissolved in the molten PCM migrates from the solidifying PCM to the remaining molten PCM in the center of the pellet. This air ultimately forms a void within the center of the solidified pellet into which melted PCM can later expand. Metal can then be applied to the flexible material to form a rigid PCM capsule.

In the following disclosure, various specific embodiments are described. It is to be understood that those embodiments are example implementations of the disclosed inventions and that alternative embodiments are possible. All such embodiments are intended to fall within the scope of this disclosure.

Generally speaking, there are two main obstacles to the successful encapsulation of thermal energy storage media, such as PCM. The first obstacle is the expansion of the PCM upon melting. The second obstacle is the expansion of air comprised within pores of the PCM. The combined expansion of the PCM and the air creates huge pressure build up within the capsule, which could ultimately result its rupture.

The problem of PCM expansion can be resolved by (i) inducing and matching the porosity in the PCM pellet with the percentage expansion of the molten PCM, (ii) creating a void inside the pellet that is equal to or greater than the expansion of the molten PCM, and/or (iii) providing a flexible coating over the PCM pellet that enables the expanding air to escape. Of these three solutions, the latter solution enables the fabrication of the PCM pellet with little concern over the available void space for the PCM expansion. Accordingly, this enables cost reduction by decreasing the number of steps involved in the manufacturing process. However, the problem of air expansion can only be resolved by having a selectively permeable coating over the pellet that enables air, but not molten PCM, to pass.

The above-described challenges can be overcome using the disclosed encapsulation processes. One such process comprises coating a solid pellet of PCM with a flexible, selectively permeable coating, slowly heating the coated pellet to enable the gradual diffusion of air through pores of the coating, cooling the coated pellet to enable the formation of an internal void into which molten PCM can expand, and then further coating the pellet with metal to form a rigid PCM capsule.

Figure 2:
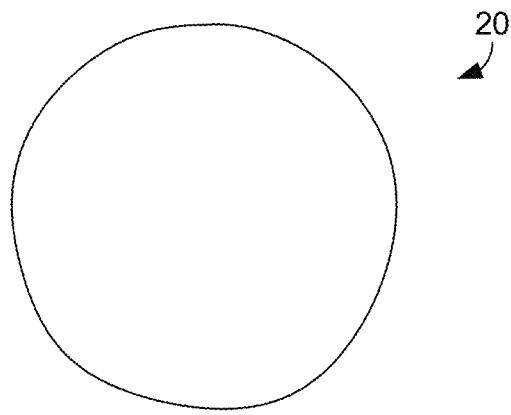
FIG. 2 is a side view of an embodiment of a pellet of thermal energy storage media that is to be encapsulated.

FIG. 1 is a flow diagram of an example method for encapsulating PCM in the manner identified above. Beginning with block 10 of FIG. 1, a pellet of PCM is formed. An example pellet 20 is illustrated in FIG. 2. As is shown in that figure, the pellet 20 can be generally spherical. That shape enables close packing of PCM capsules in, for example, a storage tank. The PCM can be substantially any PCM that would be desirable for thermal energy storage. In some embodiments, the PCM comprises an organic or inorganic salt, a salt mixture, or a salt eutectic having a relatively high melting temperature. One example of a particularly suitable salt is sodium nitrate ($NaNO_3$), which has a melting point of approximately 306° C. Table I identifies this salt, as well as various other example PCMs that could be used.

TABLE I

Example PCMs

| PCM (wt %) | Melting Point (° C.) |
|---|---|
| $LiNO_3$(30%) + $NaNO_3$(18%) + $KNO_3$(52%) | 120 |
| $LiNO_3$(33)—67$KNO_3$ | 133 |
| $LiNO_3$(55.4)—4.5$NaNO_3$—40.1KCl | 160 |
| $LiNO_3$(58.1)—41.9KCl | 166 |
| NaOH(50)—50KOH | 171 |
| $LiNO_3$(57)—43$NaNO_3$ | 193 |
| $LiNO_3$(49)—51$NaNO_3$ | 194 |
| LiOH(30)—70NaOH | 216 |
| $NaNO_3$(54)—46$KNO_3$ | 222 |
| NaOH(20)—80$NaNO_2$ | 230 |
| NaOH(73)—27$NaNO_2$ | 237 |
| $NaNO_2$ | 270 |
| $NaNO_3$ | 306 |
| $KNO_3$ | 334 |
| LiCl(32.90)—34.8NaCl—32.3KCl | 357 |
| $MgCl_2$(60)—19.6NaCl—20.4KCl | 383 |

Figure 3:
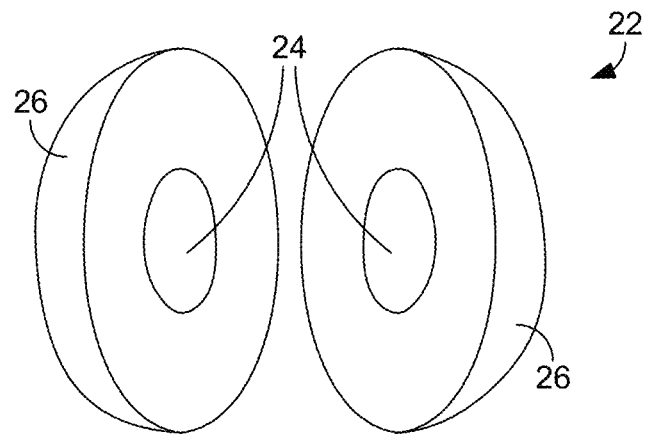
FIG. 3 is a side view of a further embodiment of a pellet of thermal energy storage media having a pre-formed internal void.

In some embodiments, the pellet 20 has a diameter of approximately 1 to 2 inches. Of course, the pellet 20 can have larger or smaller dimensions, as well as different shapes, depending upon the application and the desired outcome. The pellet 20 can be completely solid with no internal voids. In other embodiments, the pellet can have a pre-formed internal void that provides space for the PCM to expand into when it melts. FIG. 3 shows an example of a pellet 22 that comprises an internal void 24. As shown in that figure, the pellet 22 can be formed from two halves 26 that can be joined together to form the whole pellet. Several available PCMs are powerful oxidizers, especially in the molten state. These PCMs have great potential for reacting with many organic and inorganic reducing agents. Therefore, the use of an organic bonding material for joining the two halves 26 of the pellet 22 may not be suitable as it reacts with the PCM, which may not only cause failure of the coating but may also reduce the required thermophysical properties of the PCM used. Such problems can be avoided by joining the two halves 26 of the pellet 20 by heat fusing them together. In some embodiments, this process involves blowing hot air over the joint formed by the two halves 26 until the PCM located at the joint melts and later solidifies in a controlled manner. Another approach involves applying molten PCM over the joint of the pellet 20, which is kept at ambient temperature. The molten PCM used for this purpose could be the same material or another material that melts at a lower temperature.

With reference back to FIG. 1, once a pellet has been formed it can be coated with flexible material to form a coated pellet, as indicated in block 12. In some embodiments, the flexible material is a polymeric material. To avoid changing the thermophysical properties of the PCM, a non-reactive polymeric material can be selected that will not react with the PCM. Example non-reactive polymeric materials include polytetrafluoroethylene (PTFE), fluorinated ethylene propylene (FEP), perfluoroalkoxy (PFA), and mixtures thereof. As described below, a layer of metal can be formed over the coated pellet to provide greater structural integrity to the PCM capsule and to improve its performance and longevity, particularly at temperatures higher than the melting point of the flexible material. As is further described below, such a layer can be formed using electroless and electrolytic processes that involve the application of plating solutions that may contain additives, such as organic substances, that can react with the PCM. Unfortunately, it is possible for this plating solution to permeate the non-reactive polymeric material applied to the PCM pellet and therefore reach the PCM. In addition, water from the plating solutions may reach the PCM and create expansion problems that could later rupture the capsule. In such situations, it is desirable to apply further polymeric material that is impermeable to such solutions. Examples of impermeable polymeric materials include polyimide, polyvinylidene fluoride (PVDF), and mixtures thereof. While solvents used to apply these materials can react with PCMs, the first polymer layer (e.g., of PTFE, FEP, PFA, or a combination thereof), prevents the second polymer layer from reaching the PCM. In view of the above discussion, in some embodiments, coating the pellet with a flexible material comprises first applying a non-reactive (to the PCM) polymeric material to the pellet and then applying an impermeable (to the plating solution) polymeric material over the non-reactive polymeric material. Irrespective of the polymeric material or materials that are used, the materials are selectively permeable, meaning that they enable air to pass but do not enable molten PCM to pass.

Figure 4:
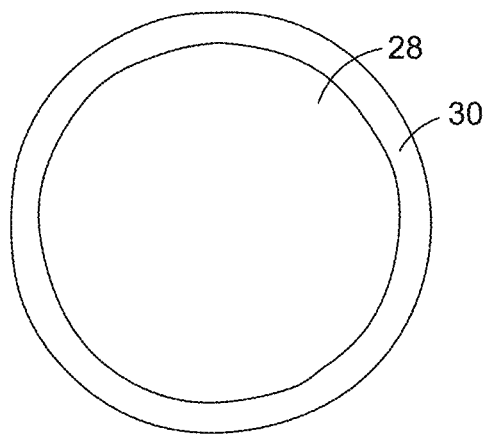
FIG. 4 is a cross-sectional view of a pellet that has been coated with a layer of flexible material.

FIG. 4 illustrates the pellet 20 (which is assumed for this example not to comprise an internal void) after it has been coated with a layer 30 of flexible material. As described above, the layer 20 can comprise multiple individual layers of polymeric material, which can be different. In some embodiments, the layer or layers can be formed by powder coating with polymeric particles and then applying pressure to fuse the polymeric particles together to form a uniform polymeric layer. In other embodiments, strips of polymer film are wrapped around the PCM pellet 20 and the wrapped pellet is pressed to form a monolithic layer of polymer over the pellet. When multiple polymeric layers are used, strips of a first polymer film can be applied to the pellet 20, strips of a second polymer film can be applied to the first polymer film, and the coated pellet can be pressed and heated to fuse the two different polymers together to form a uniform layer 30 of flexible material. In still other embodiments, one or more types of polymer film are formed into a desired (e.g., spherical) shape and molten PCM is poured into it, followed by pressing to form the desired shape of the coated pellet. Regardless of the technique used to form the layer 30, the layer can, for example, be approximately 0.1 to 2 mm thick.

Figure 5:
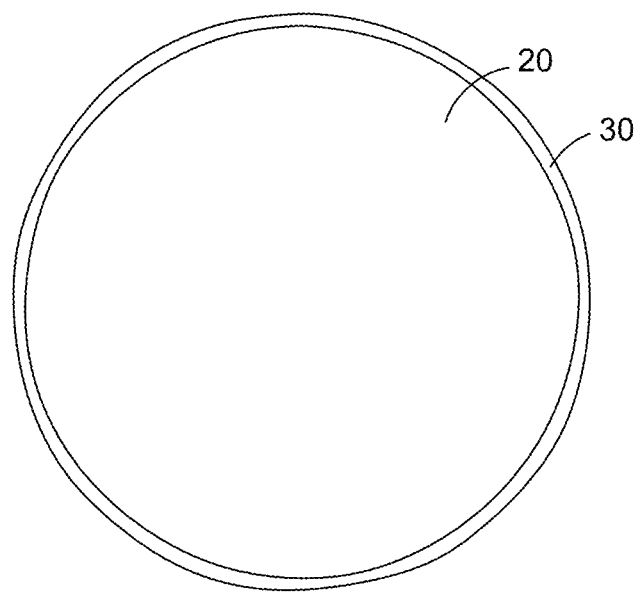
FIG. 5 is a cross-sectional view of the coated pellet of FIG. 4 after the pellet has been heated.

With reference next to block 14 of FIG. 1, the coated pellet is then heated to a temperature beyond the melting point of the PCM. In some embodiments, the coated pellet is heated to a temperature that is only moderately higher than the PCM melting point. For example, if the PCM has a melting point of approximately 306° C., the pellet can be heated to approximately 316° C. As the coated pellet is heated and the PCM melts, the PCM and the air that was contained within the pores of the solid PCM expand. As a result, as shown in FIG. 5, the pellet 20 and its layer 30 of flexible material likewise expand. Because the layer 30 is selectively permeable, the air within the PCM can diffuse out through the layer 30 of flexible material under the increased pressure within the pellet 20. In some embodiments, the diameter of the coated pellet can increase by up to approximately 20% once all of the PCM has melted. It is noted that this heating may also cause blending of two or more polymeric materials used to form the flexible layer 30 of material.

Figure 6:
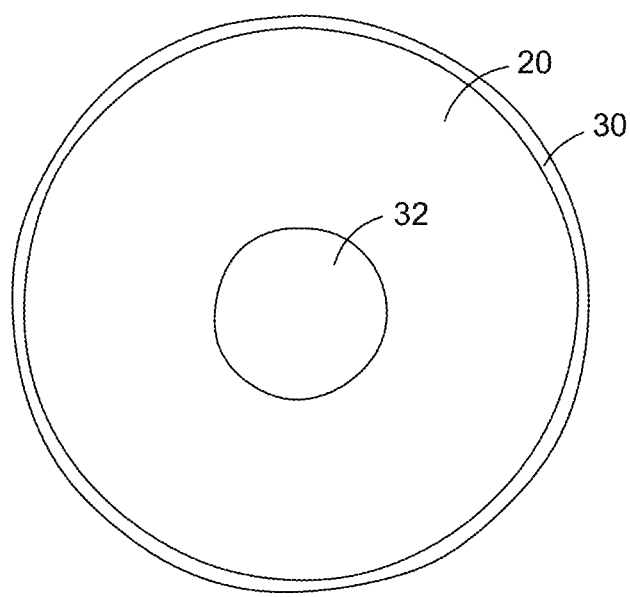
FIG. 6 is a cross-sectional view of the coated pellet of FIG. 5 after it has been cooled.

Referring next to block 16 of FIG. 1, the coated pellet is then cooled to enable the PCM to solidify. During the cooling process, the PCM solidifies from the outside—in so that much of the increased dimension of the pellet 28 is maintained. As the remainder of the PCM solidifies, air that was dissolved in the molten PCM migrates to the center of the pellet 28 and ultimately forms an internal void 32, as shown in FIG. 6, which provides space for expansion of the PCM when the pellet is reheated and the PCM again melts.

Figure 7:
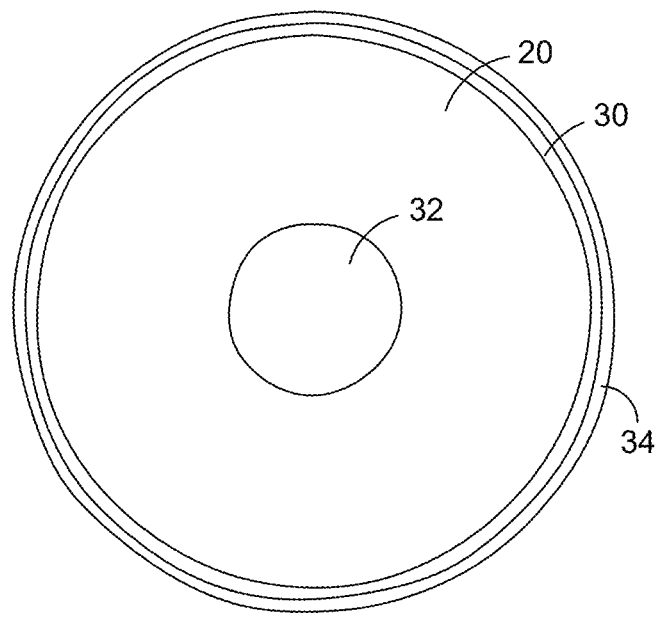
FIG. 7 is a cross-sectional view of the coated pellet of FIG. 6 after it has been further coated with metal.

Once the entire mass of PCM has solidified, metal can be deposited on the coated pellet to form a rigid capsule, as indicated in block 18 of FIG. 1. FIG. 7 shows the pellet 20 including a layer 34 of metal. In some embodiments, the metal layer 34 can comprise multiple individual layers of different metals. In some cases, binding metal is first applied to the coated pellet to render the polymer layer 30 solvophillic and/or hydrophilic and enable another metal to adhere to the coated pellet. For example, small particles (e.g., 20 to 30 µm in diameter) of nickel, palladium, aluminum, copper, or alloys thereof can be first applied to the coated pellet using a powder coating technique such as rubbing, jar milling, or rolling the coated pellet in the particles. Once deposited, the particles act as binding agent for subsequent metal that is deposited. Notably, the binding metal can, in some embodiments, be deposited on the coated pellet prior to the heating step identified in relation to block 14.

After the binding metal particles have been deposited, one or more further layers of metal can be deposited. In some embodiments, the further layers of metal can comprise copper, nickel, tin, palladium, cobalt, silver, zinc or alloys thereof and can be deposited using an electroless deposition technique.

In the electroless deposition process, a catalyst is applied to the object to be plated to catalyze and initiate the deposition of metal. The deposition of catalyst can be accomplished by a process that can be broadly categorized as a water-based process or an organic solvent-based process. Water-based processes often employ colloidal palladium. In organic solvent-based processes, a precursor of palladium, such as palladium acetate or one or more other organic ligand-based palladium compounds, is used. In this process, the palladium precursor is decomposed either thermally or by the application of some reducing agent to obtain zero valent palladium.

In some embodiments, an organic solvent solution is used to deposit a catalyst precursor on the polymeric material. For example, acetone can be used to deposit palladium acetate on the material. Once the solution has been applied, it can be heated to decompose the palladium acetate. By way of example, the solution can be heated to a temperature of approximately 250 to 300° C. In alternative embodiments, however, a reducing agent, such as sodium borohydride, hydrazine hydrate, lithium aluminum hydride, or the like, could be added to the solution to decompose the palladium acetate at room temperature.

Once the coated pellet has been rendered electrically conductive through the electroless deposition of metal, electroplating can then be used to apply further metal. Accordingly, the metal layer 34 can, in some embodiments, be formed using a three-step process in which a binding metal is first deposited, further metal is then deposited using electroless plating, and then additional metal is next deposited using electroplating. Irrespective of the metals or deposition techniques used, the completed metal layer 34 can be approximately less than a micron to greater than 2.0 mm thick.

Figure 8:
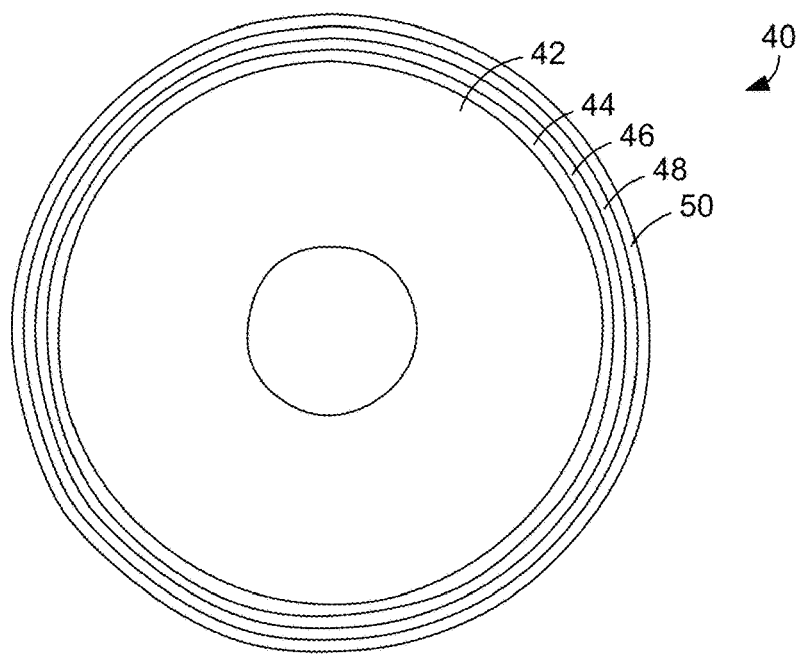
FIG. 8 is a cross-sectional view of an alternative embodiment for a thermal energy storage media capsule.

It is noted that a metal layer 34 need not be formed in all situations. For example, if a metal layer is not needed for structural integrity, the PCM capsule may only comprise the polymer-coated PCM pellet. It is further noted that multiple alternate polymer and metal layers can be formed, if desired. For example, a PCM capsule can be formed that includes a first polymer layer covered by a first metal layer, which is covered by a second polymer layer, which is, in turn, covered by a second metal layer. FIG. 8 illustrates such a capsule 40, which includes a PCM pellet 42, a first polymer layer 44, a first metal layer 46, a second polymer layer 48, and a second metal layer 50.

Described below are multiple examples of pellet encapsulation that were performed to fabricate PCM capsules.

Example 1

Sodium nitrate pellets having a 27 mm diameter were formed with a 30% void space inside. The pellets were formed from two halves that were fused together by blowing hot air (by using hot air nozzle) over the joint formed between the halves. No foreign material was used for fusing the pellets. The fused pellets were then wrapped with PTFE film (1 g or 2 g). PTFE was chosen because there was no evident change in the decomposition profile of the PTFE in contact with sodium nitrate (TGA analysis) up to 530° C. The PTFE-wrapped pellets were then heated at 325° C. for a few minutes and pressed to fuse the multiple layers of the PTFE tape into monolithic layers. This prevented the seepage of aqueous and non-aqueous solution from the metallization step into the pellets. Without the formation of monolithic layers, the rejection rate during the metallization step was large. However, the thermal pressing drastically reduced the rejection rate.

Next, the monolithic PTFE-wrapped pellets were metallized using electroless and electroplating processes. The metals used were nickel, copper, zinc or zinc-iron, or zinc-nickel alloy. The metallization was achieved by applying multiple layers of metal. The first step involved the deposition of a very thin layer of nickel (1-10 µm) over the PTFE. The layer of metal was intentionally left porous. The metal-coated pellets were then heated to 316 or 326° C. (10-20° C. above the melting point of sodium nitrate) for 80 minutes. During this step, the sodium nitrate melted and migrated into the voids, and the air that was trapped in the voids escaped through the porous coating layers.

When the sodium nitrate begins to solidify it contracts. The negative pressure of that contraction pulls the coating inward and therefore wrinkles were seen in the outer layers of the pellets. Diffusion of air back through the coatings and solidified salt was hindered by the metal and the outer solid salt layers. Another layer of nickel was then built over the top of the thermal-cycled pellets. The thermal heat cycle (326° C.) was repeated and the pellets were plated again. This process was repeated till a non-permeable (i.e., non-permeable to air as well as molten salt) metal layer was obtained. This metal layer was formed through four metallization steps resulting in approximately 100-200 µm of metal covering the PTFE-coated salt pellet. The salt capsule was then tested and has gone through more than 1,000 thermal cycles without failure.

Example 2

Sodium nitrate pellets were formed as described in Example 1. A layer of PTFE was formed over the pellet followed by a layer of FEP and then a further layer of PTFE to form a flexible layer having three individual polymer layers. The coated pellet was then heated to 326° C. for one hour. During this time, the FEP melted and blended with the PTFE to form a uniform PTFE-FEP composite layer over the pellet. The coated pellets were then metallized and tested as described in Example 1.

Example 3

Salt pellets were coated with PTFE and then coated with polyimide (PI-84) resin. The resin was cured at 290° C. for one hour. The coated pellets were subjected to a first thermal cycle at 316° C. and then metallized with a combination of nickel and copper. The pellets were tested at 350° C. for nine cycles and then at 326° C. for 30 cycles.

Example 4

A PTFE-coated pellet having an internal void was coated with a carbon fiber and polyimide composite material and cured at 290° C. for one hour. The coated pellet was tested at 350° C.

Example 5

A PTFE-coated pellet having an internal void was subjected to heating at 350° C. for 80 minutes. After the first thermal cycle, the PTFE-coated pellet was metalized as described in Example 1 to form a capsule and was subjected to thermal cycles. The capsule underwent 300 thermal cycles.

Example 6

A PTFE-coated pellet having no internal void was subjected to heating at 326° C. for 80 minutes. The size of the pellet increased because of the expansion of the salt. After cooling, the PTFE was metalized as described in Example 1 and was subjected to greater than 2,000 thermal cycles.

Example 7

A PTFE-coated pellet having no internal void was subjected to heating at 326° C. then metalized as described in Example 1. A further layer of PTFE was wrapped over the metal layer. The outer PTFE layer was then metalized by electroless and electroplating processes. Accordingly, a double layer of polymer and metal was formed over the salt pellet. The amount of coating material was the same as that of a single-layered pellet. The pellet was tested at 350° C. for 80 minutes. The pellets survived about 450 thermal cycles. The average number of cycles survived at 350° C. by double-layered pellets was greater than the single-layered pellets. It is pertinent to mention that thermal cycling at 350° C. was 22° C. above the melting point of the PTFE. The double metal layer sandwiches a PTFE layer to prevent physical deformation of the PTFE above its melting point and thus lead to better performance.

Example 8

A LiCl—NaCl—KCl eutectic hemispherical pellet having no internal void was fabricated. This eutectic material is highly hygroscopic, which affects its thermophysical properties. PTFE tape (1 g or 2 g) was wrapped over the pellet and pressed in an automatic hydraulic press by applying 7,000 lbs. of force to form a transparent, uniform film of PTFE over the eutectic material. A thin layer of nickel was deposited over the PTFE by electroless process as described above. The metalized pellet was then heated to 380° C. for one hour. During this step, the eutectic material melted and expanded, and the moisture in the material escaped, leaving a pure eutectic material having optimum thermophysical properties. The pellet was then electroplated with nickel to 200 μm of thickness. The resulting capsule was then tested at 380° C. for 80 minutes.

Example 9

A salt pellet of sodium nitrate(54)-46potassium nitrate eutectic, which melts at 222° C., was coated with FEP and subjected to thermal cycling at 240° C. No metal was applied to the coated pellet.

Example 10

A salt pellet of lithium nitrate(33)-67potassium nitrate eutectic, which melts at 133° C., was coated with FEP and subjected to thermal cycling at 170° C. with water, air, or oil as heat transfer fluids. No metal was applied to the coated pellet.

As can be appreciated from the foregoing discussion, the disclosed thermal energy storage media capsules enable solar energy to be collected and stored during the day and to be used at night and at other non-solar times. Moreover, they provide the thermal energy storage at low cost. The capsules may reduce the cost of thermal energy storage for solar thermal power from about $50/kWh$_{th}$ to less than $15/kWh$_{th}$. The encapsulated thermal energy storage is also useful for nuclear power and many industrial applications.

Figure 9:
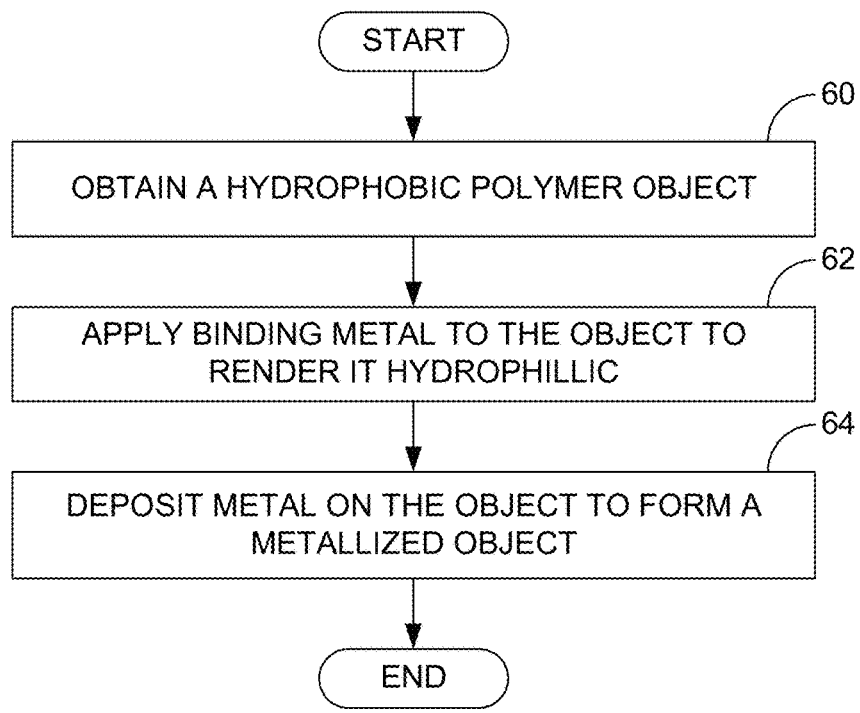
FIG. 9 is a flow diagram of an embodiment of a method for metalizing a hydrophobic polymer.

While the foregoing discussion has focused on the formation of thermal energy storage media capsules, it is noted that processes used to form the capsules can be used in other contexts. For example, the disclosed metallization steps can be used to apply metal to hydrophobic polymers. FIG. 9 illustrates an example of such a method. Beginning with block 60, a hydrophobic polymer object is obtained. The polymer can comprise substantially any hydrophobic polymer. Examples include PTFE, FEP, PFA, polyimide, PVDF, and mixtures thereof.

Next, as indicated in block 62, binding metal is applied to the object to render it solvophillic and/or hydrophilic. For example, small particles (e.g., 20 to 30 μm in diameter) of nickel, palladium, aluminum, copper, and alloys thereof can be applied to the object to act as binding agent for subsequent metal that is to be deposited. In some embodiments, the particles can be applied using powder coating techniques, such as rubbing, jar milling, or rolling.

Once the binding metal has been applied, metal can be deposited on the object to form a metallized object, as indicated in block 64. In some embodiments, the further layers of metal can comprise copper, nickel, tin, palladium, cobalt, silver, zinc, or alloys thereof and can be deposited using an electroless deposition technique followed by electroplating once the object has been rendered electrically conductive through the electroless deposition of metal. Accordingly, as with the metallization of coated pellets, the hydrophobic polymer can be metallized using a three-step process in which a binding metal is first deposited, further metal is then deposited using electroless plating, and then additional metal is next deposited using electroplating. Irrespective of the metals or deposition techniques used, the completed metal layer can be approximately less than a micron to greater than 2 mm thick.

The invention claimed is:

1. A method for depositing metal on a polymer surface, the method comprising:
    obtaining a hydrophobic polymer having a surface;
    powder coating the surface of the hydrophobic polymer with small particles of a binding metal to render the polymer surface solvophillic and/or hydrophilic;
    electrolessly depositing a first layer of plating metal on the binding metal-coated polymer surface to render the surface electrically conductive; and
    directly depositing via electroplating a second layer of plating metal on the first layer of plating metal such that no other material is provided between the first and second layers of plating metal.

2. The method of claim 1, wherein the hydrophobic polymer comprises polytetrafluoroethylene (PTFE), fluorinated ethylene propylene (FEP), perfluoroalkoxy (PFA), polyimide, polyvinylidene fluoride (PVDF), or mixtures thereof.

3. The method of claim 1, wherein powder coating comprises applying nickel, palladium, aluminum, copper, or alloys thereof to the surface of the hydrophobic polymer.

4. The method of claim 1, wherein the particles are approximately 2 to 30 microns in diameter.

5. The method of claim 1, wherein powder coating comprises one of rubbing, jar milling, or rolling the particles onto the surface of the hydrophobic polymer.

6. The method of claim 1, wherein the first layer of plating metal comprises copper, nickel, tin, palladium, cobalt, silver, zinc or alloys thereof.

7. The method of claim 1, wherein the second layer of plating metal comprises copper, nickel, tin, palladium, cobalt, silver, zinc or alloys thereof.

8. The method of claim 1, wherein electrolessly depositing comprises first applying a catalyst to the binding metal-coated polymer surface.

9. The method of claim 8, wherein applying a catalyst comprises applying a catalyst precursor using an organic solvent solution.

10. The method of claim 8, wherein electrolessly depositing comprises electrolessly depositing the first layer of plating metal using a water-based process.

11. The method of claim 8, wherein electrolessly depositing comprises electrolessly depositing the first layer of plating metal using an organic solvent-based process.

12. The method of claim 11, wherein the organic solvent-based process comprises decomposing a metal precursor either thermally or by application of a reducing agent.

* * * * *